Figure 1:
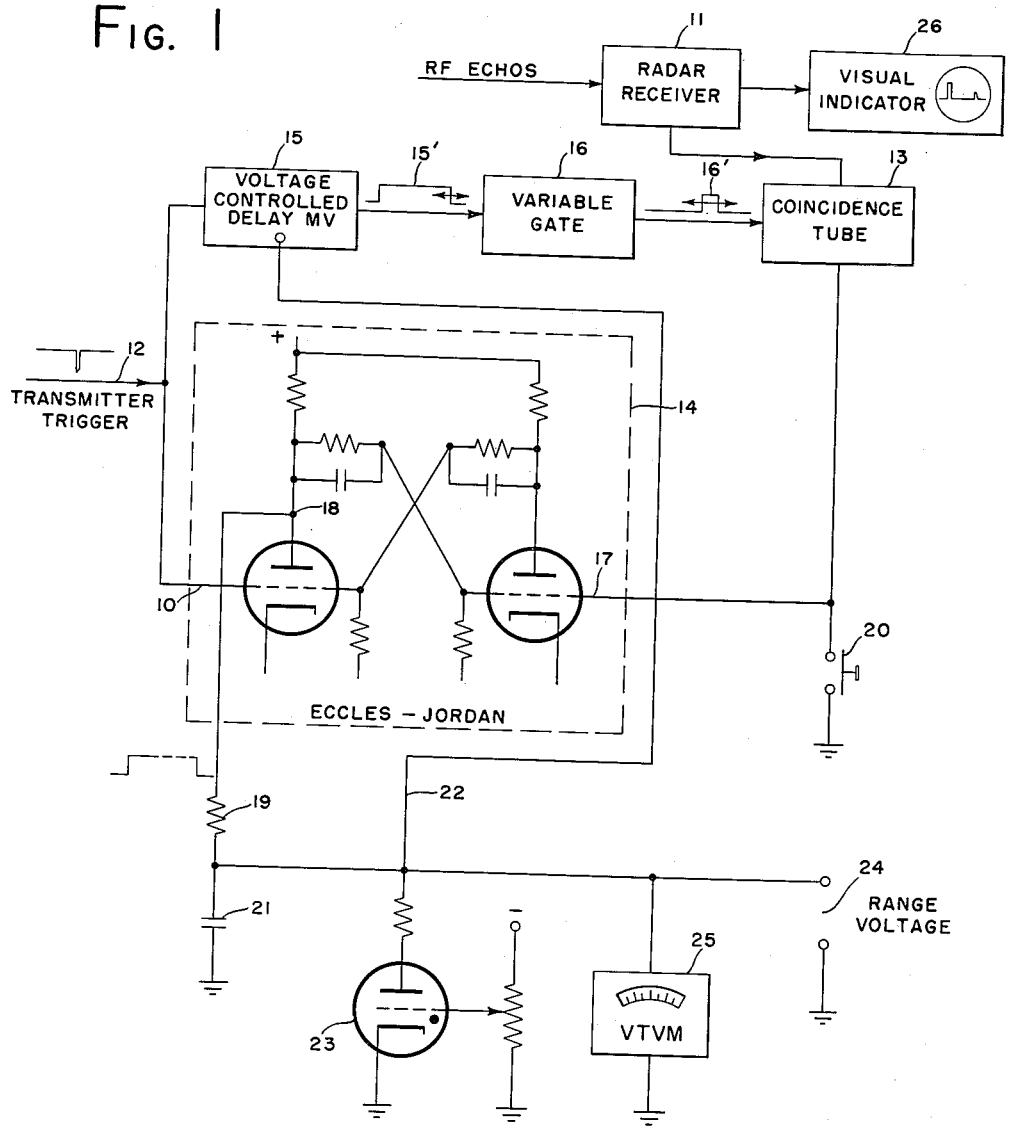

March 27, 1956

H. GOLDBERG 2,740,112

AUTOMATIC RANGE GATE

Filed May 28, 1952

2 Sheets-Sheet 1

INVENTOR.
HAROLD GOLDBERG

BY

Killman, Kerst and Pfund
ATTORNEYS

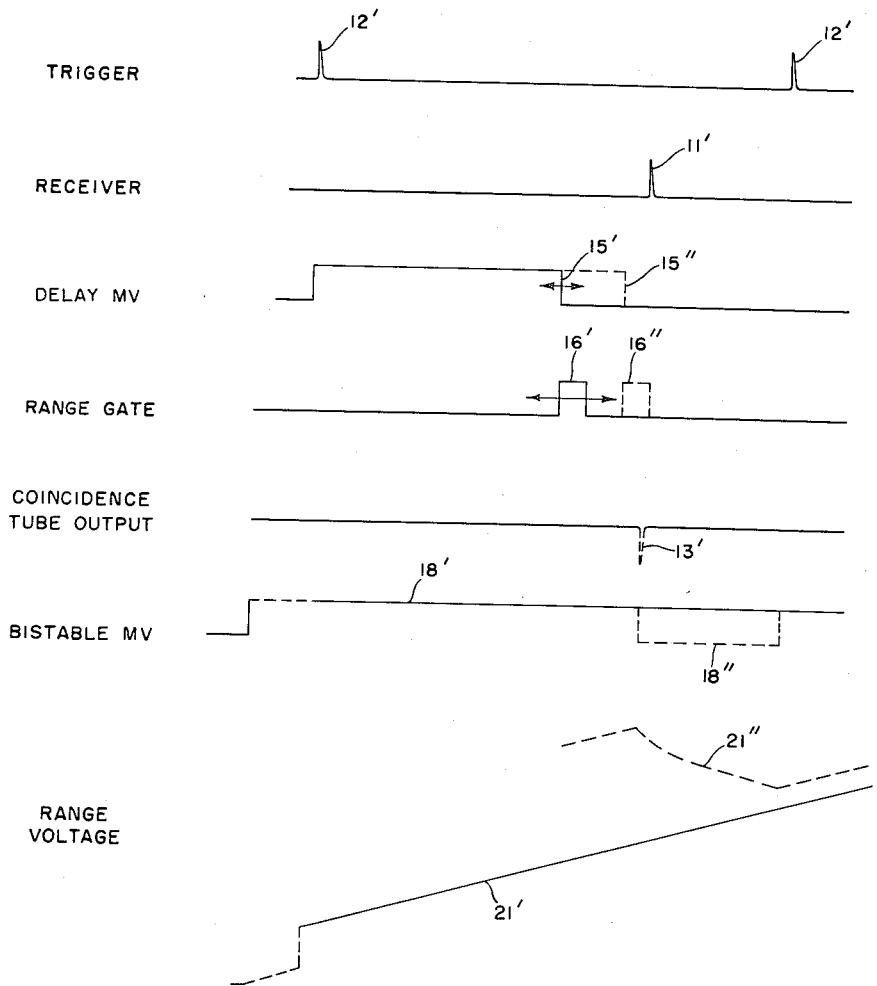

United States Patent Office 2,740,112
Patented Mar. 27, 1956

2,740,112

AUTOMATIC RANGE GATE

Harold Goldberg, Washington, D. C., assignor to Bendix Aviation Corporation, Towson, Md., a corporation of Delaware Application May 28, 1952, Serial No. 290,473

5 Claims. (Cl. 343—7.3)

This invention relates generally to electrical control circuits and more particularly to such circuits as used, for example, to derive an automatic control signal representative of target range in a pulsed radar system.

Automatic range tracking circuits have been provided in the past in various forms one of which is the type using adjacent time selectors. These circuits, while producing generally satisfactory results, have been relatively complex and expensive to manufacture and have added to the size and weight of the equipment in which they are employed.

Accordingly, it is the primary object of the present invention to provide a simplified and reliable automatic timing circuit.

Another object is to provide an automatic range gate which automatically scans the range-time domain for the presence of target echoes and tracks such an echo when one is present.

A further object is to provide a range measuring circuit in which the range scanning action is utilized with the signals derived from target acquisition to provide the two-directional control of the position of a range gate.

These and other objects of the invention are accomplished by means of a voltage controlled delayed gate and a bi-stable circuit for controlling a positioning voltage in response to two signals. The bi-stable circuit operates in response to the transmitter trigger pulses of the radar to initiate a charging cycle which starts the traverse of a delay gate. The delayed gate is used to control the termination of the charging cycle in coincidence with received echo signals. The resultant action is to produce a positioning voltage which maintains the delayed gate in coincidence with the echo signals and is available as a signal voltage representing range.

The invention may be better understood by reference to the following detailed description taken in conjunction with the accompanying drawing wherein:

Fig. 1 is a block and partial schematic diagram of an arrangement in accordance with the present invention; and Fig. 2 is a timing diagram useful in explaining the operation thereof.

In Fig. 1, there is shown a system connected to the conventional portions of the radar system including a receiver 11 and a source of transmitter trigger signals 12. Video output signals from the receiver 11 are applied to a coincidence tube 13, the output of which is blocked in the absence of an enabling gate applied as hereinafter described.

The trigger signals on line 12 are applied to one input 10 of a bistable multivibrator circuit 14 or the like such as, for example, the well known Eccles-Jordan circuit and to a voltage controlled delay multivibrator 15. The output of the delay multivibrator 15 is applied to a variable gate circuit 16, the output of which is a narrow gate pulse which is applied as an enabling gate to the coincidence tube 13. The generation of the gate by circuits 15 and 16 may be accomplished, for example, by the corresponding circuits disclosed in U. S. Patent No. 2,577,536. The output of the coincidence tube 13 is applied to an input terminal 17 of the circuit 14 which is separate from the input terminal 10 to which is applied the transmitter trigger signals.

From the circuit 14 a potential is derived at a suitable point 18 which is connected through a resistance 19 to charge a capacitor 21. The point 18 is indicated in the fragmentary schematic of the Eccles-Jordan circuit as being at the plate of the tube to which the transmitter trigger pulses are applied at grid 10. It is to be understood, however, that other bi-stable circuit arrangements than the Eccles-Jordan may be satisfactorily employed and the derivation of a charging potential such as that at point 18 may be selected from such other circuits.

The voltage across capacitor 21 is applied by lead 22 as the control voltage for circuit 15 which determines the time position of the trailing edge of the pulse produced thereby in response to trigger signals. The voltage across capacitor 21 is also applied to a relaxation device such as gas tube 23 which may be selectively biased to relax and discharge capacitor 21 when the voltage thereacross has reached a predetermined level. This voltage is also provided at terminal 24 as the automatic range voltage, as will be hereinafter described.

Referring now to Fig. 2, the operation of the circuit of Fig. 1 will be described. The transmitter trigger pulses 12' initiate each timing cycle and any received echo signals 11' occur on the range-time scale in accordance with their distance from the radar antenna. The trigger 12' switches the delay multivibrator 15 and produces the variable position trailing edge 15' in accordance with the control voltage from capacitor 21. The trailing edge 15' generates a narrow gate 16'. In the absence of time coincidence of the gate 16' and echo 11', the output of the coincidence tube is zero and the voltage at point 18 remains at a high level 18' and condenser 21 continues to charge therefrom as shown at 21'. For some subsequent trigger signal 12', as the condenser 21 continues to charge, the trailing edge 15' reaches a position 15" at which the corresponding gate 16" is in coincidence with the echo signal 11'. This condition produces an output signal 13' from the coincidence tube which causes the bi-stable circuit 14 to change condition and the voltage at point 18 is reduced to a level 18". For this condition of the circuit 14, condenser 21 discharges as at 21", the voltage thereacross is reduced and the trailing edge 15" and the gate 16" move to the left. Due to this action there results a failure of coincidence between the signals 11' and 16", causing the disappearance of the coincidence signal 13' and the level 18' is again maintained until condenser 21 charges sufficiently to move the gate 16" far enough to the right to again be in coincidence with the signal 11'. Each time the coincidence condition causes the circuit 14 to change to the level 18" the next succeeding trigger pulse 12' returns the point 18 to the level 18'. The system thus operates to make the range gate 16" hunt around the position of the echo signal 11' and the value of voltage across condenser 21 is a measure of this position. The range may be determined by a suitably calibrated voltmeter 25. In the event that no echo signal is received by the time the condenser 21 has charged to a predetermined level corresponding to the end of the range scale, the gas tube 23 conducts discharging the condenser 21. The next transmitter pulse re-establishes the level 18', condenser 21 again starts to charge and the search cycle begins again.

Any target in the scanned range may be selected for tracking by a comparison of the range indications on the voltmeter 25 and the echo corresponding thereto on visual indicator 26. By momentarily depressing pushbutton switch 20 echo signals may be successively released by progressing outwardly on the range scale until the desired target is in the gate 16' and the system is tracking it in range.

Circuit 14 could be in the form of an astable multivibrator with an unstable conduction period slightly less than the interval between pulses. Such a circuit would automatically revert to its stable state just prior to each trigger 12', and reinitiate the range search upon occurrence of the next transmitter trigger.

Obviously, other circuits could be employed to perform the functions of the various component circuits described and the particular circuits shown are to be understood as being merely exemplary.

What is claimed is:

1. In a pulse echo system in which pulses of energy are periodically propagated and reflected echoes of said pulses are received, automatic range means comprising, charge storage means, a bistable state generator for alternately charging and discharging said storage means depending on the state thereof, means for generating a gating wave delayed from said pulses in accordance with the value of the said charge, means for triggering said generator into one of said states with the occurrence of said pulses, means for triggering said generator into the other of said states in response to the coincidence of said gating wave and one of said echoes, and means responsive to a predetermined value of said charge for discharging said storage means.

2. In a pulse echo system in which pulses of energy are periodically propagated and reflected echoes of said pulses are received, automatic range means comprising, charge storage means, an astable state generator for alternately charging and discharging said storage means depending on the state thereof, means for generating a gating wave delayed from said pulses in accordance with the value of the said charge, means for triggering said generator into an unstable state with the occurrence of said pulses, means for triggering said generator into a stable state in response to the coincidence of said gating wave and one of said echoes, and means responsive to a predetermined value of said charge for discharging said storage means, the unstable period of said generator being less than the period between said pulses.

3. In a pulse echo system in which pulses of energy are periodically propagated and reflected echoes of said pulses are received, automatic range means comprising, charge storage means, a voltage generator having two states, in each of which it generates a voltage having a respective level, means applying said voltage to said charge storage means, means for generating a gating waveform variably delayed from the time of occurrence of said propagated pulses in response to an applied voltage, means applying the charge on said charge storage means to said gate generating means to control said delay, means triggering said generator into one of said states in coincidence with the propagation of each of said pulses, means triggering said generator into the other of said states in response to the coincidence of one of said echoes and said gating waveform and means responsive to a predetermined value of said charge for discharging said storage means.

4. In a pulse echo system in which pulses of energy are periodically propagated and reflected echoes of said pulses are received, automatic range means comprising, charge storage means, a multivibrator having a square wave output, means generating a gating wave delayed from the instant of excitation of said generating means by a controllable interval, means applying the output of said multivibrator to said charge storage means whereby said storage means is charged during excursions of said multivibrator output having one polarity and discharged during excursions of said multivibrator output having the opposite polarity, means applying the charge stored in said storage means to said generating means to control said delay interval, means exciting said generating means and initiating an excursion of the square wave output of said multivibrator of said one polarity simultaneously with the propagation of each of said pulses, means terminating the last named excursion and initiating one of the opposite polarity simultaneously upon the coincidence of one of said reflected pulse echoes and said gating wave and means responsive to a predetermined value of said charge to discharge said storage means.

5. In a pulse echo system in which pulses of energy are periodically propagated and reflected echoes of said pulses are received, automatic range means comprising, charge storage means, an astable multivibrator having a square wave output, means generating a gating wave delayed from the instant of excitation of said generating means by a controllable interval, means applying the output of said multivibrator to said charge storage means whereby said storage means is charged during excursions of said multivibrator output having one polarity and discharged during excursions of said multivibrator output having the opposite polarity, means applying the charge stored in said storage means to said generating means to control said delay interval, means exciting said generating means and initiating an excursion of the square wave output of said multivibrator of said one polarity simultaneously with the propagation of each of said pulses, means terminating the last named excursion and initiating one of the opposite polarity simultaneously upon the coincidence of one of said reflected pulse echoes and said gating wave and means responsive to a predetermined value of said charge to discharge said storage means, the unstable period of said multivibrator being less than the period between said pulses.

References Cited in the file of this patent

UNITED STATES PATENTS

| | | |
|---|---|---|
| 2,421,018 | De Rosa | May 27, 1947 |
| 2,485,584 | Ginzton | Oct. 25, 1949 |
| 2,491,029 | Brunn | Dec. 13, 1949 |
| 2,639,419 | Williams | May 19, 1953 |